United States Patent
Foskey et al.

(10) Patent No.: US 10,829,199 B2
(45) Date of Patent: Nov. 10, 2020

(54) ACTIVE AIRFLOW MANAGEMENT FOR TILTROTOR HUB THERMAL VENTILATION

(71) Applicant: Bell Helicopter Textron Inc., Fort Worth, TX (US)

(72) Inventors: Christopher Edward Foskey, Keller, TX (US); Michael Christopher Burnett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 241 days.

(21) Appl. No.: 16/105,215

(22) Filed: Aug. 20, 2018

(65) Prior Publication Data

US 2020/0055586 A1 Feb. 20, 2020

(51) Int. Cl.
*B64C 11/02* (2006.01)
*B64C 23/00* (2006.01)
*B64C 27/28* (2006.01)
*B64C 29/00* (2006.01)

(52) U.S. Cl.
CPC .............. *B64C 11/02* (2013.01); *B64C 23/00* (2013.01); *B64C 27/28* (2013.01); *B64C 29/0033* (2013.01)

(58) Field of Classification Search
CPC ......... B64C 11/02; B64C 11/14; B64C 23/00; B64C 27/28; B64C 29/0033; B64C 416/94; F02C 7/055
USPC ...................................................... 244/53 B
See application file for complete search history.

(56) References Cited

U.S. PATENT DOCUMENTS

| 4,278,220 | A | * | 7/1981 | Johnston | F02K 1/72 244/110 B |
|---|---|---|---|---|---|
| 6,082,669 | A | * | 7/2000 | Bardagi | F02C 7/042 244/53 B |
| 7,222,819 | B1 | * | 5/2007 | Kelnhofer | B64D 13/00 244/53 B |
| 2011/0001019 | A1 | * | 1/2011 | Bouldin | B64D 41/00 244/53 B |
| 2015/0274290 | A1 | * | 10/2015 | Fenny | B64C 27/50 244/17.25 |
| 2015/0375860 | A1 | * | 12/2015 | Hong | B64D 35/00 244/12.4 |
| 2016/0039515 | A1 | * | 2/2016 | VanBuskirk | B64C 5/02 244/6 |
| 2017/0297698 | A1 | * | 10/2017 | Alber | B64C 39/04 |

* cited by examiner

*Primary Examiner* — Richard R. Green
*Assistant Examiner* — Arfan Y. Sinaki
(74) *Attorney, Agent, or Firm* — Fogarty LLP

(57) ABSTRACT

Embodiments are directed to an aerodynamic spinner fairing having a sidewall and one or more airflow intakes in the sidewall. The airflow intakes are closed during a first phase of flight and open during a second phase of flight. The first phase of flight may be an airplane mode for a tiltrotor aircraft, and the second phase of flight may be a helicopter mode for the tiltrotor aircraft. The airflow intakes may comprise an opening in the sidewall, and a door that is configured to move between a first position covering the opening and a second position exposing the opening to external airflow. An actuator coupled to the door may operate to move the door between the first position and the second position. One or more guide vanes within the aerodynamic spinner fairing may be configured to direct air received via the airflow intakes to provide convection cooling.

17 Claims, 6 Drawing Sheets

ACTIVE AIRFLOW MANAGEMENT FOR TILTROTOR HUB THERMAL VENTILATION

BACKGROUND

Contemporary tiltrotor hub designs incorporate numerous elastomeric bearings to allow for flapping, feathering, and various rotor motions. The operation of mechanisms that utilize elastomeric bearings unavoidably have the capacity to generate considerable thermal energy as the strain in the elastomer layer generates high temperatures as the bearing is exercised through its envelope of motions. Sustained operation in a high-temperate environment degrades both the performance and longevity of elastomeric bearings to such a degree that excess temperatures may cause a bearing to fail in operation. Due to this effect, the flight envelopes of tiltrotors may be restricted to avoid generating temperatures that exceed component materials' capabilities.

SUMMARY

Embodiments are directed to an aerodynamic spinner fairing having a sidewall and one or more airflow intakes in the sidewall. The airflow intakes are closed during a first phase of flight and open during a second phase of flight. The first phase of flight may be an airplane mode for a tiltrotor aircraft, and the second phase of flight may be a helicopter mode for the tiltrotor aircraft. The aerodynamic spinner may be attached to a proprotor that moves between a vertical position and a horizontal position. The airflow intakes may comprise an opening in the sidewall, and a door that is configured to move between a first position covering the opening and a second position exposing the opening to external airflow. The door may open outward above the sidewall or inward inside the sidewall. The opening may comprise a NACA duct design. An actuator coupled to the door may operate to move the door between the first position and the second position. One or more guide vanes within the aerodynamic spinner fairing may be configured to direct air received via the airflow intakes to provide convection cooling.

BRIEF DESCRIPTION OF THE DRAWINGS

Figure 1:
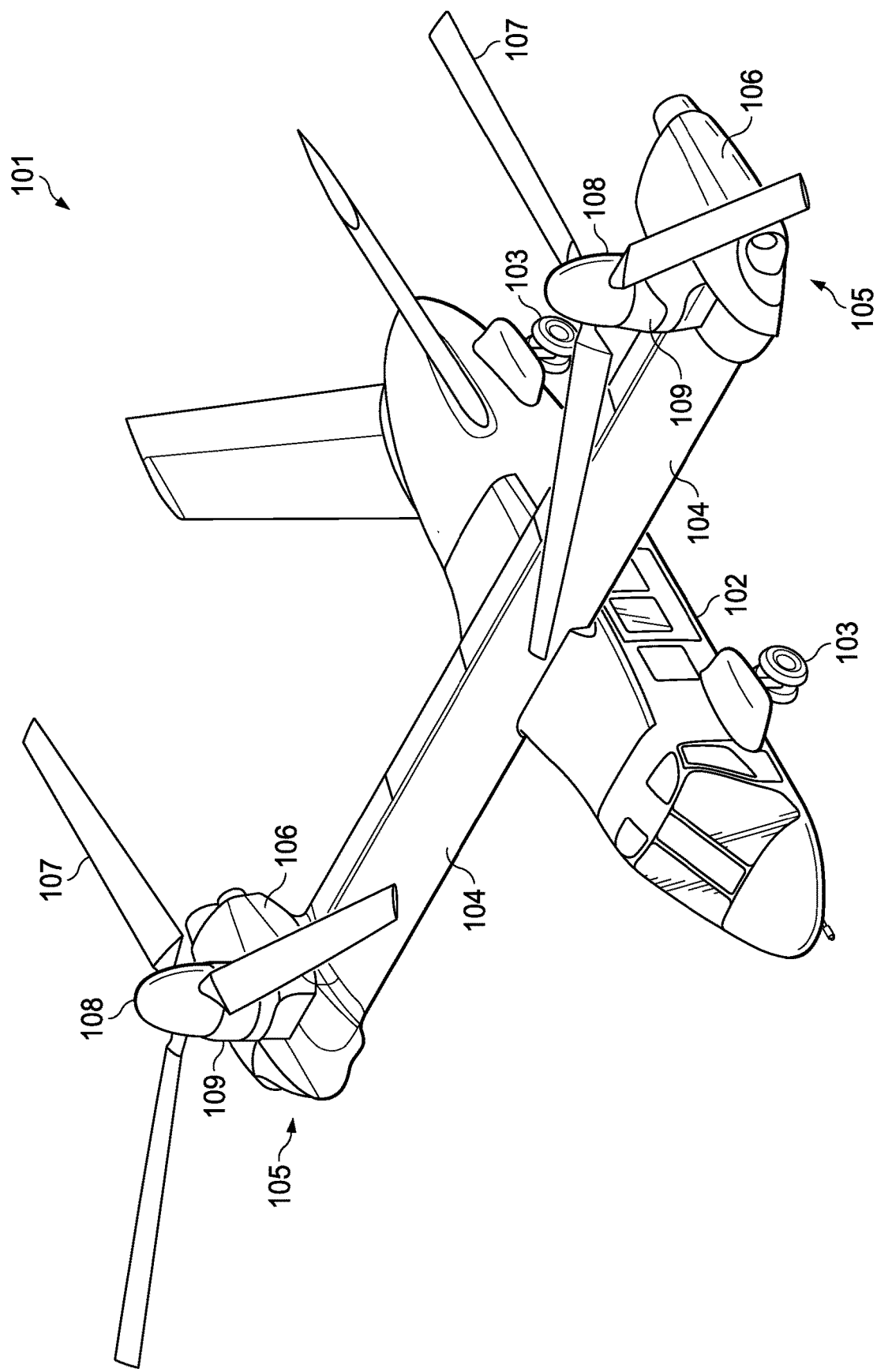

Having thus described the invention in general terms, reference will now be made to the accompanying drawings, which are not necessarily drawn to scale, and wherein:

FIG. 1 illustrates a tiltrotor aircraft in a helicopter mode wherein the proprotors are positioned substantially vertical for use with certain embodiments.

Figure 2:
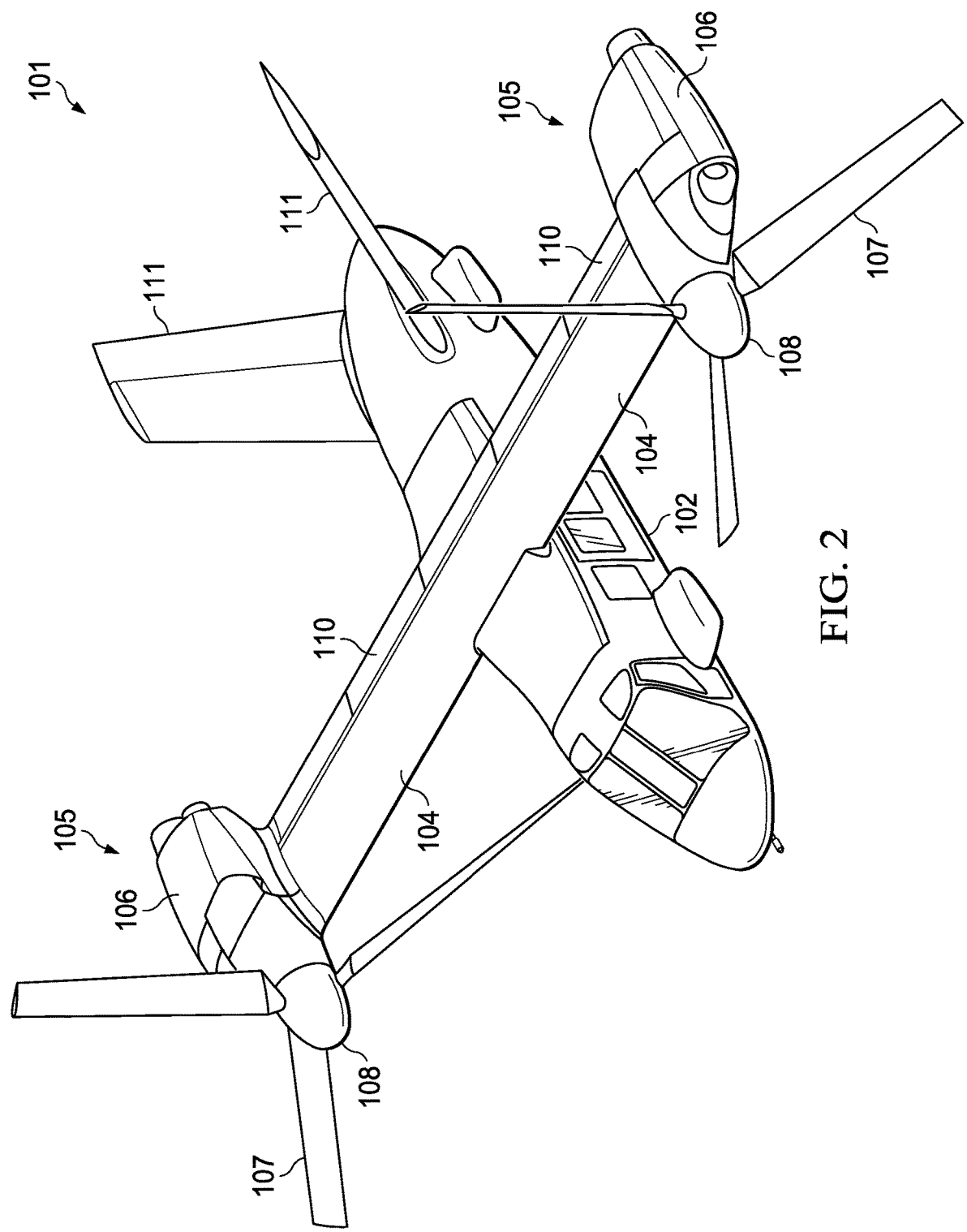

FIG. 2 illustrates the tiltrotor aircraft of FIG. 1 in an airplane mode wherein the proprotors are positioned substantially horizontal.

Figure 3A:
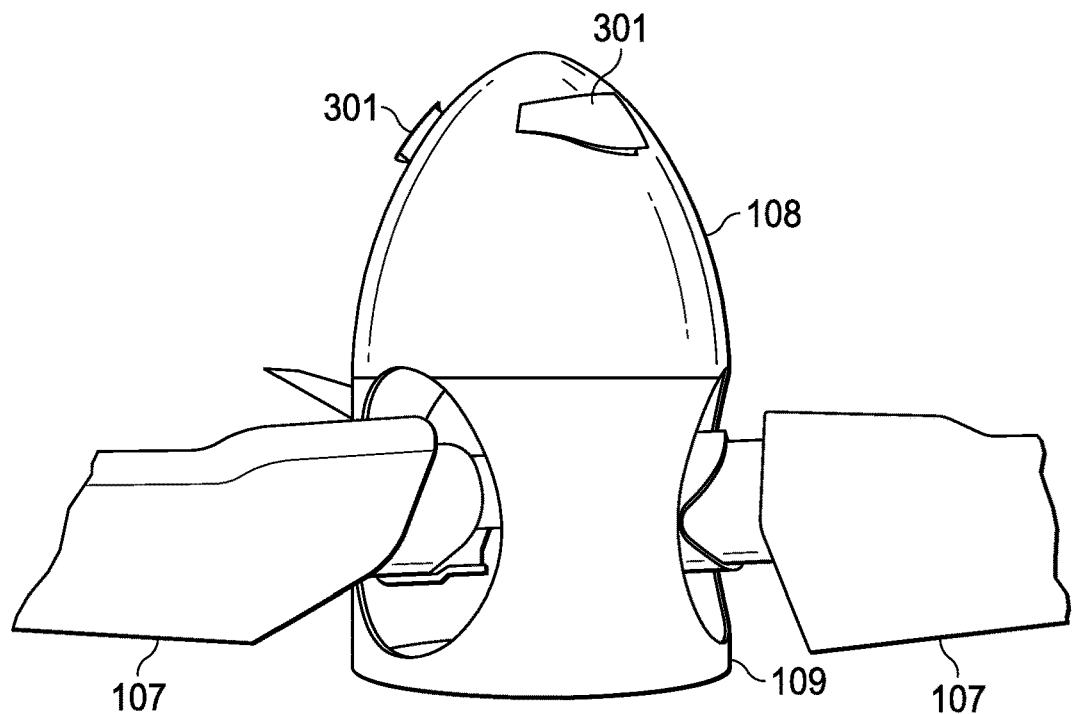

FIG. 3A is side view of the rotor blades, aerodynamic spinner, and nacelle fairing sections of a propulsion system operating in a helicopter mode as shown in FIG. 1.

Figure 3B:
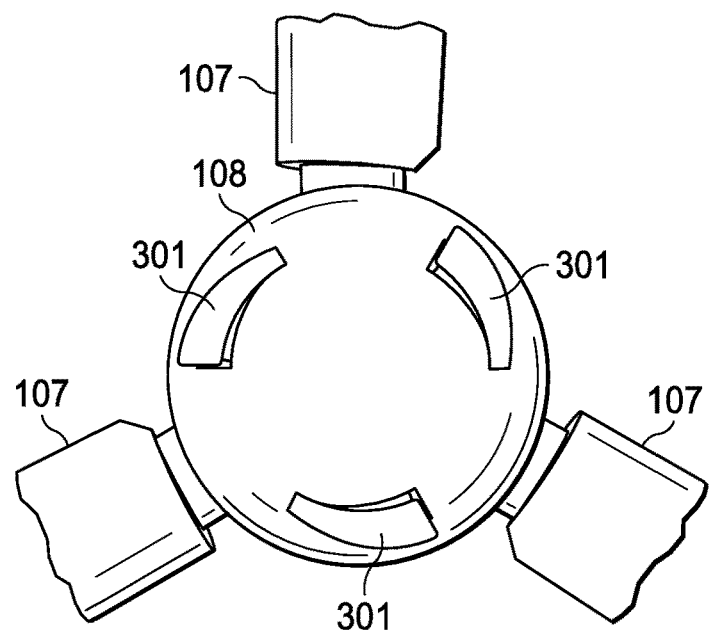

FIG. 3B is a top view of the rotor blades and aerodynamic spinner shown in FIG. 3A.

Figure 4A:
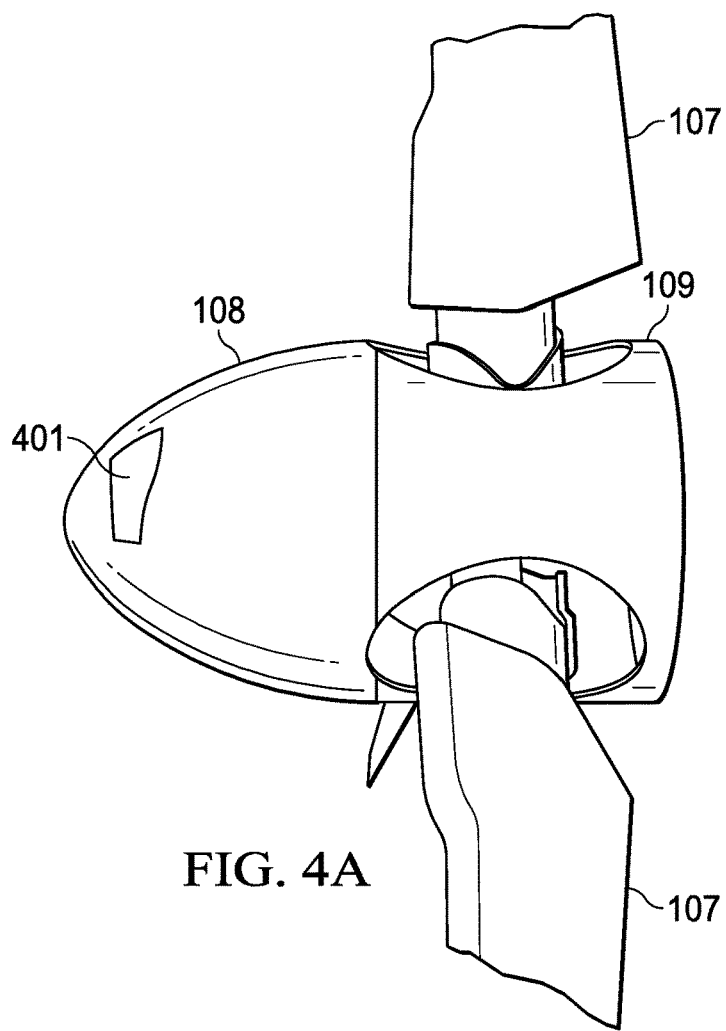

FIG. 4A is side view of the rotor blades, aerodynamic spinner, and nacelle fairing sections of a propulsion system operating in an airplane mode as shown in FIG. 2.

Figure 4B:
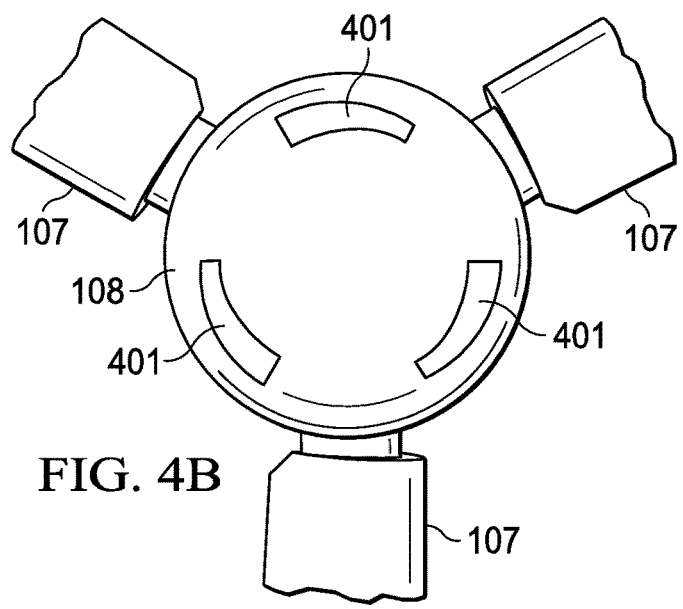

FIG. 4B is a view of the front of the rotor blades and aerodynamic spinner shown in FIG. 4A.

Figure 5A:
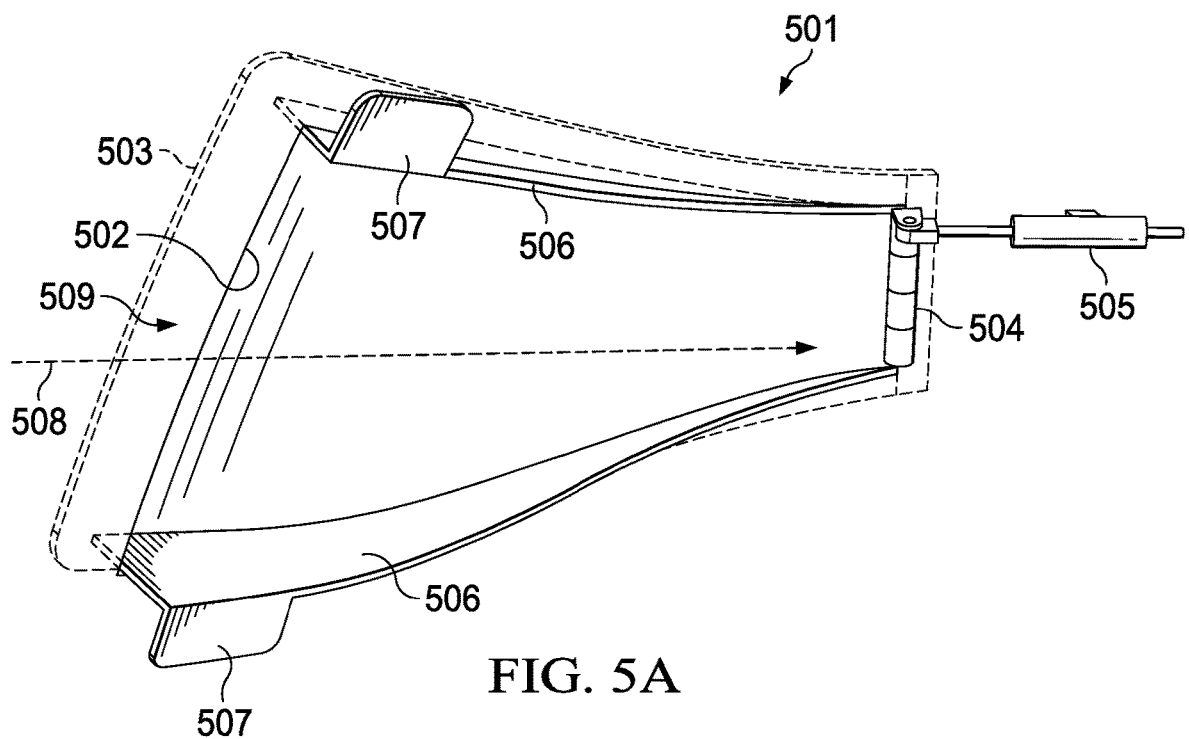

FIG. 5A illustrates a deployable intake duct shown in an open or deployed position according to an example embodiment.

Figure 5B:
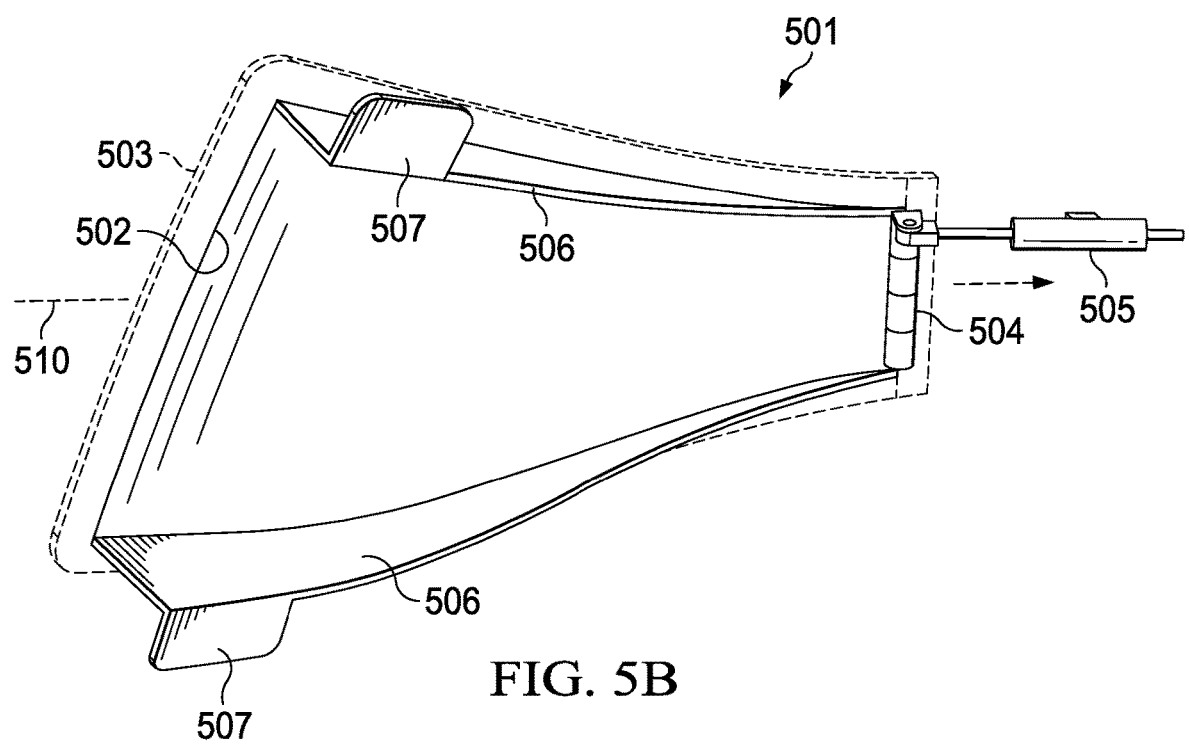

FIG. 5B illustrates the deployable intake duct of FIG. 5A in a closed position.

Figure 6:
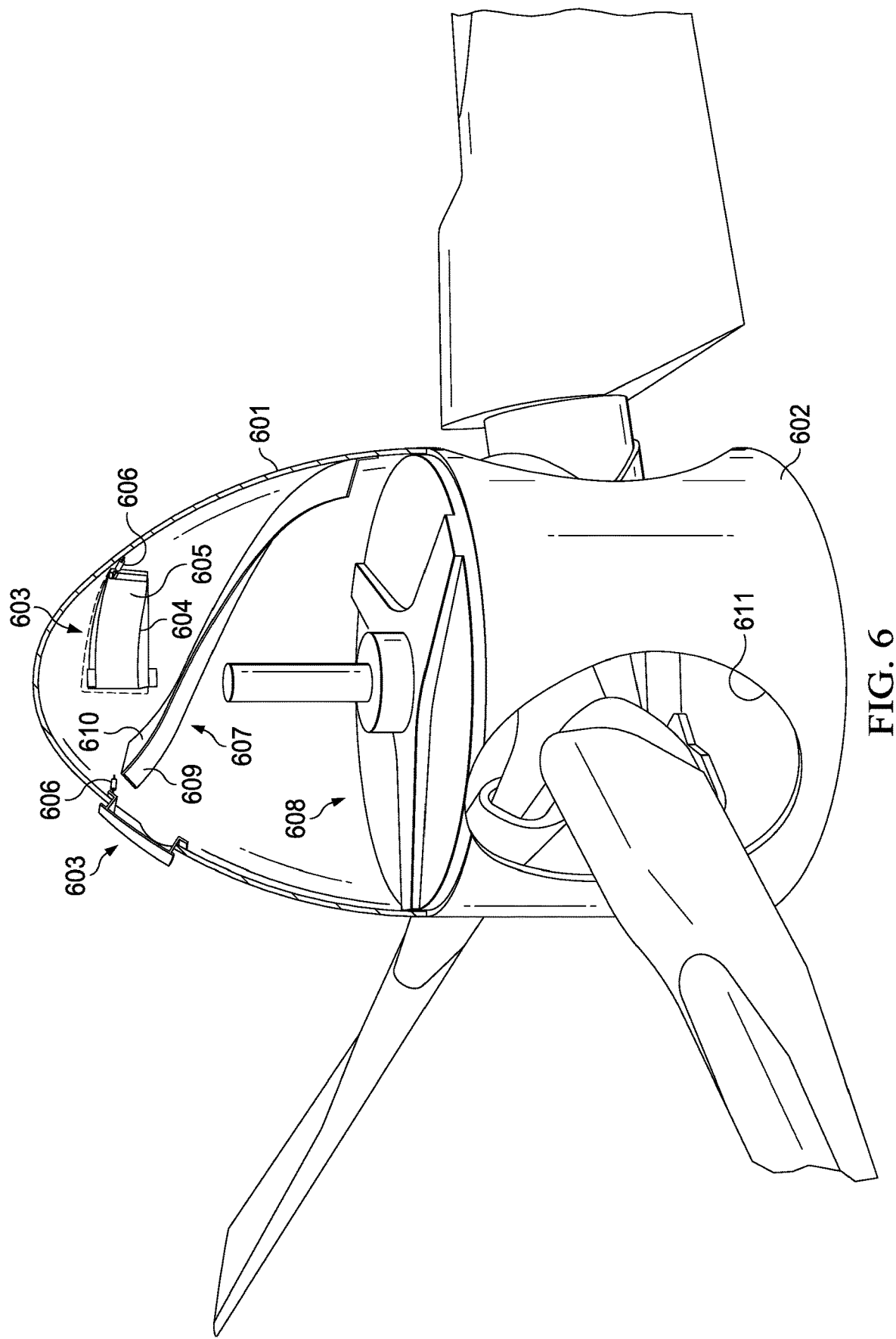

FIG. 6 is a cutaway view of a spinner attached to a nacelle fairing illustrating components of an example embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a tiltrotor aircraft 101 in a helicopter mode wherein proprotors 107 are positioned substantially vertical to provide a lifting thrust. FIG. 2 illustrates tiltrotor aircraft 101 in an airplane mode wherein proprotors 107 are positioned substantially horizontal to provide a thrust for forward movement. Tiltrotor aircraft 101 may include fuselage 102, landing gear 103, and wings 104. A propulsion system 105 is positioned on the ends of wings 104. Each propulsion system 105 includes an engine 106 and a proprotor with a plurality of rotor blades 107. The rotor blades 107 are coupled to an internal rotor structure located within an aerodynamic spinner fairing 108. During operation, engines 106 typically maintain a constant rotational speed for their respective proprotors 107. The pitch of rotor blades 107 can be adjusted to selectively control thrust and lift of each propulsion system 105 on tiltrotor aircraft 101. The tiltrotor aircraft 101 includes controls, e.g., cyclic controllers and pedals, carried within a cockpit of fuselage 102, for causing movement of the aircraft 101 and for selectively controlling the pitch of each blade 107 to control the direction, thrust, and lift of tiltrotor aircraft 101. For example, during flight a pilot can manipulate a cyclic controller to change the pitch angle of rotor blades 107 and/or manipulate pedals to provide vertical, horizontal, and yaw flight movement.

Propulsion system 105 includes a nacelle fairing 109 that is configured to rotate along with other rotatable pylon structure to improve aerodynamic airflow. Moveable nacelle fairing 109 can be mechanically coupled to an actuator system used for moving the proprotors 107 between airplane mode and helicopter mode. During the airplane mode, vertical lift is primarily supplied by the airfoil profile of wings 104, while rotor blades 107 provide forward thrust. During the helicopter mode, vertical lift is primarily supplied by the thrust of rotor blades 107. It should be appreciated that tilt rotor aircraft 101 may be operated such that propulsion systems 105 are selectively positioned between airplane mode and helicopter mode, which can be referred to as a conversion mode. Control surfaces 110 on wing 104 are used to adjust the attitude of tiltrotor aircraft 101 around the pitch, roll, and yaw axes while in airplane or conversion mode. Additional stabilizers or control surfaces 111 may be required when tiltrotor aircraft 101 is in airplane mode. Control surfaces 110 and 111 may be, for example, ailerons, flaps, slats, spoilers, elevators, or rudders.

A propulsion system 105 for a tiltrotor aircraft 101 typically features a power train, drive shaft, hub, swashplate, and pitch links within nacelle fairing 109 and protected by aerodynamic spinner 108. The drive shaft and hub are mechanical components for transmitting torque and/or rotation from the engine 106 to the rotor blades 107. The power train may include a variety of components, including a transmission and differentials. In operation, the drive shaft receives torque or rotational energy from engine 106 and rotates the hub, which causes blades 107 to rotate about the drive shaft. A swashplate translates flight control input into motion of blades 107. Because rotor blades 107 are typically spinning when tiltrotor aircraft 101 is in flight, the swashplate transmits flight control input from the non-rotating fuselage 102 to the hub, blades 107, and/or components coupling the hub to blades 107 (e.g., grips and pitch horns).

In an example embodiment, the swashplate may include a non-rotating swashplate ring and a rotating swashplate ring. The non-rotating swashplate ring does not rotate with the drive shaft, whereas the rotating swashplate ring does rotate with drive shaft. Pitch links connect the rotating swashplate ring to blades 107. In operation, translating the non-rotating swashplate ring along the drive shaft axis causes the pitch links to move up or down. This changes the pitch angle of all blades 107 equally, increasing or decreasing the thrust of the rotor and causing the tiltrotor aircraft 101 to ascend or descend. Tilting the non-rotating swashplate ring causes the rotating swashplate to tilt, moving the pitch links up and down cyclically as they rotate with the drive shaft. This tilts the thrust vector of the proprotor, causing tiltrotor aircraft 101 to translate horizontally following the direction the swashplate is tilted. A constant-velocity (CV) joint may be provided between the hub and the drive shaft to allow drive shaft to transmit power through a variable angle, at constant speed, without an appreciable increase in friction or play. In general, a CV joint refers to a type of mechanism that connects two rotating components making an angle with one another. This angle may vary during service, such as may be the case with the angle between the hub and the drive shaft. A CV joint mechanically couples an input shaft to an output shaft in such a way that torque may be transmitted from the input shaft to the output shaft whilst maintaining a substantially CV characteristic. A CV characteristic refers to a characteristic wherein the instantaneous angular velocity of the input shaft is substantially matched to the instantaneous angular velocity of the output shaft throughout a full rotation of the shafts. It is to be understood that the CV characteristic may represent a design goal, and various embodiments may achieve this characteristic to a greater or lesser degree based on parameters, which may include mechanical and structural variations in the assembly. Thus, a joint may maintain a substantially CV characteristic even if the angular velocities do not perfectly match. In some embodiments, a CV joint may maintain a substantially CV characteristic despite variations in angle between the input and output shafts. In one embodiment, a CV joint features an inner yoke, an outer yoke, and positioning linkages that provide a control mechanism to maintains a CV characteristic between drive shaft and hub.

The CV joint has a hub spring, such as an elastomeric bearing, that keeps the yoke normal to the drive shaft or mast. During flight in helicopter mode, if there is a flapping input to the propulsion system 105, then the hub spring is bent over in the direction of the flapping. This causes one side of the hub spring to be compressed and the other side to be stretched. As the proprotor spins, the torsion forces cycle across the hub spring to main the flapping in the same direction. Applying these forces against a hub spring, such as elastomeric bearing, may generate a considerable amount of heat. In addition, elastomeric materials may be prone failure during tension and torsion.

Elastomeric bearings may be sized large enough to dissipate heat appropriately and to withstand the tension and torsion forces that may occur during operation of rotor system. However, a large elastomeric bearing package may require an increase in the size of various components of propulsion system 105 and blades 107. For example, the yoke would have to be larger to accommodate the elastomeric bearing package. Accordingly, such larger elastomeric bearings may not be practical.

The hub spring is located inside an interior portion of the aerodynamic spinner 109 on tiltrotor aircraft 101. For the purposes of reducing drag, particularly in airplane mode, the hub assembly is enclosed by a nacelle and spinner 109, which serve as aerodynamic fairings for the hub components. While allowing for a significant reduction in drag during forward flight, the effect is less so in low speed helicopter mode flight, and the spinner assembly 109 serves to shield and isolate the hub assembly from airflow. While this is a desirable effect from a drag perspective, a lack of airflow over hub components during helicopter mode can lead to thermal issues. The aerodynamic spinner 109 seals the hub spring and other propulsion system components, such as drive links, which cycle twice per revolution, in an enclosed area inside the interior portion aerodynamic spinner 109, thereby preventing heat from dissipating.

FIG. 3A is side view of the rotor blades 107, aerodynamic spinner 108, and nacelle fairing 109 sections of a propulsion system 105 operating in a helicopter mode as shown in FIG. 1. FIG. 3B is a top view of the rotor blades 107 and aerodynamic spinner 108 shown in FIG. 3A. Under aerodynamic spinner 108, a hub spring bearing and an array of elastomeric CV drive links that are highly loaded during operation of the rotor blades 107. In nearly all flight regimes, the tiltrotor hub experiences some degree of flapping as a result of aerodynamic forces, dynamic forces, and rotor control inputs. Generally, the magnitude of rotor flapping is greater for helicopter mode flight than for in airplane mode. In helicopter mode, edgewise flight control requires flapping to alter the thrust vector of the rotor. Accordingly, helicopter mode flight strains the elastomeric components responsible for flapping (i.e., the hub spring and CV drive links) to a much higher degree than airplane mode. The aerodynamic spinner 108 and the low speeds used during edgewise flight combine to reduce the relative airflow though nacelle fairing 109 when operating in helicopter mode. As a result, there is little convective cooling available for the hub spring and CV drive links, which increases wear and shortens the lifespan for these components.

To combat the effects of aerodynamic spinner 108 and low speeds, an array of deployable intake ducts 301 may be provided on spinner 108. The deployable intake ducts 301 may be located, for example, around the exterior at the top or nose of spinner 108. Each deployable intake duct 301 comprises a deployable surface, such as a hinged door or flap, that protrudes into the ambient air when activated. In an alternative embodiment, the deployable intake duct may hinge inwardly to form a NACA duct or scoop. The deployable intake duct 301 provides a ram-air scoop effect that ventilates the interior cavity of the spinner assembly. The intake air captured by the deployable intake duct 301 becomes a vortex within spinner 108 and flows over the hub components to provide cooling airflow. Rotor 107 flapping is specifically temperature-limited from the bearing perspective. The use of forced-air convective cooling provided by intake ducts 301 mitigates the temperature rise within spinner 108 and allows for more prolonged flapping activity compared to traditional designs.

FIG. 4A is side view of the rotor blades 107, aerodynamic spinner 108, and nacelle fairing 109 sections of a propulsion system 105 operating in an airplane mode as shown in FIG. 2. FIG. 4B is a view of the front of the rotor blades 107 and aerodynamic spinner 108 shown in FIG. 4A. A protuberance, such as an intake duct, would be detrimental to overall drag characteristics of a tiltrotor aircraft, particularly when operating in high-speed airplane mode flight. Accordingly, the intake ducts 401 on the spinner 108 are closed when the propulsion system 105 is rotated forward. The position of each intake door or duct may be controlled by an actuator or mechanism that allows it to move between a stowed position 401 to create a more aerodynamic spinner surface when the tiltrotor aircraft enters a flight regime in which convective cooling air is not necessary or when the value of convective cooling air would be outweighed by the drag created by the intake ducts. The deployment and stowage of the intake duct array 401 may be automated based upon a set of predetermined criteria and/or the intake ducts may be crew-actuated, such as when bearing or nacelle temperatures exceed warning values.

FIG. 5A illustrates a deployable intake duct 501 shown in an open or deployed position according to an example embodiment. An opening 502 is formed in the surface of an aerodynamic spinner. The size and shape of opening 502 may be selected based upon the amount of cooling air required, the size of the spinner, the rotational speed of the spinner, the number of intake ducts, and any other appropriate design parameters. A door or flap 503 is attached to a hinge 504 and positioned over opening 502. An actuator 505 is coupled to door 503 and is configured to open and close door 503. Actuator 505 may be a mechanical, hydraulic, or electrical device that is controlled automatically, such as by a flight control computer running a software algorithm, or manually by a flight crew. Door 503 may have side rails 506 that are configured to fit within opening 502 and to maintain door 503 in alignment with opening 502. Side rails 506 may also comprise tabs or stops 507 that are positioned to prevent door 503 from opening more than a desired amount by engaging with the sidewall of the spinner. When door 503 has been opened by actuator 505, as shown in FIG. 5A, airflow 508 is captured by opening 509 of the intake duct 501 and directed inside the spinner. The siderails 506 may be positioned to further guide intake air 508 into the spinner and toward a hub spring bearing, elastomeric CV drive links, and/or other components that require cooling airflow.

FIG. 5B illustrates the deployable intake duct 501 of FIG. 5A in a closed position. When door 503 has been closed by actuator 505, as shown in FIG. 5B, airflow 510 is no longer captured by the intake duct 501, but instead is directed around the outside of the spinner. Door 503 may be sized larger than opening 502 so that it covers the opening when closed. In other embodiments, door 503 and opening 502 may be compatibly sized so that door 503 closes into opening 502 and flush with the surface of the spinner. In other embodiments, instead of using a single door 503 at opening 502, a shutter or a plurality of doors may be used to allow or block air from entering the opening 502.

In other embodiments, instead of opening above the outside of the spinner, door 503 may open inwardly within the spinner to form a NACA inlet duct or scoop. The primary concern is to introduce airflow within the spinner and, therefore, the actual direction of the airflow within the spinner may be irrelevant or of less importance as long as convective cooling is introduced.

FIG. 6 is a cutaway view of a spinner 601 attached to a nacelle fairing 602. Spinner 601 has a plurality of intake ducts 603. Each intake duct 603 comprises an opening 604 in the sidewall of the spinner 601 and a door 605 that is hinged to move between open and closed positions relative to opening 604. An actuator 606 operates to open and close the door 605. In some embodiments, a guide vane 607 may be mounted within the spinner to direct the airflow from intake 603. Guide vane 607 may be positioned to force or direct intake air toward rotor components 608, such as a hub spring bearing and elastomeric CV drive links. Guide vane 607 has a generally helical form with an L-shaped cross-section. A first side 609 of the guide vane 607 may be attached to the inner surface of spinner 601 or to other mounting hardware (not shown). A second side 610 of the guide vane 607 is configured to route the flow of intake air from a duct 603. For example, the bottom surface of second side 610 may direct intake airflow downward toward rotor components 608. The intake air may exit through rotor opening 611 in nacelle fairing 602 after passing over the rotor components. It will be understood that the helical, L-shaped guide vane 607 illustrated in FIG. 6 is just one example and that any appropriate guide vane, ducting, channels, or other airflow routing mechanism may be used within spinner 601.

Embodiments of the present disclosure are not limited to any particular setting or application, and embodiments can be used with a rotor system in any setting or application such as with other aircraft, vehicles, or equipment. It will be understood that tiltrotor aircraft 101 is used merely for illustration purposes and that any aircraft, including fixed wing, rotorcraft, commercial, military, or civilian aircraft may use active airflow management for tiltrotor hub thermal ventilation as disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A device, comprising:
   an aerodynamic spinner fairing for a tiltrotor aircraft, the aerodynamic spinner fairing having a sidewall; and
   one or more airflow intakes in the sidewall, wherein the airflow intakes are configured to be closed during an airplane mode phase of flight and are configured to be open during a helicopter mode phase of flight.

2. The device of claim 1, wherein the aerodynamic spinner is attached to a proprotor that is configured to move between a vertical position for the helicopter mode phase of flight and a horizontal position for the airplane mode phase of flight.

3. The device of claim 1, wherein the airflow intakes comprise:
   an opening in the sidewall; and
   a door configured to move between a first position covering the opening and a second position exposing the opening to external airflow.

4. The device of claim 3, wherein the door opens outward above the sidewall.

5. The device of claim 3, wherein the door opens inward inside the sidewall.

6. The device of claim 3, wherein the opening comprises a NACA duct design.

7. The device of claim 3, further comprising:
   an actuator coupled to the door, the actuator configured to move the door between the first position and the second position.

8. The device of claim 1, further comprising:
   one or more guide vanes within the aerodynamic spinner fairing and configured to direct air received via the airflow intakes to provide convection cooling.

9. A tiltrotor aircraft, comprising:
   a fuselage;
   a wing member;
   a power train coupled to the wing member and comprising a power source and a drive shaft in mechanical communication with the power source; and
   a rotor system in mechanical communication with the drive shaft, at least part of the rotor system being tiltable between a helicopter mode position and an airplane mode position, the rotor system comprising:
   an aerodynamic spinner fairing having a sidewall; and
   one or more airflow intakes in the sidewall, wherein the airflow intakes are configured to be closed during the airplane mode and open during the helicopter mode.

10. The tiltrotor aircraft of claim 9, wherein the airflow intakes comprise:
    an opening in the sidewall; and
    a door configured to move between a first position covering the opening and a second position exposing the opening to external airflow.

11. The tiltrotor aircraft of claim 10, wherein the door opens outward above the sidewall.

12. The tiltrotor aircraft of claim 10, wherein the door opens inward inside the sidewall.

13. The tiltrotor aircraft of claim 10, wherein the opening comprises a NACA duct design.

14. The tiltrotor aircraft of claim 10, further comprising:
    an actuator coupled to the door, the actuator configured to move the door between the first position and the second position.

15. The tiltrotor aircraft of claim 9, further comprising:
    one or more guide vanes within the aerodynamic spinner fairing and configured to direct air received via the airflow intakes to provide convection cooling.

16. A rotor system for a tiltrotor aircraft, comprising:
    an actuator system configured to move the rotor system between a helicopter mode having a vertical orientation and an aircraft mode having a horizontal orientation;
    an aerodynamic spinner coupled to a first end of the rotor system, the aerodynamic spinner having a sidewall;
    one or more airflow intake doors in the sidewall, wherein the airflow intake doors are configured to be open during the helicopter mode and closed during the airplane mode;
    and an actuator coupled to the airflow intake door. the actuator configured to move the airflow intake door between a first position and a second position.

17. The rotor system of claim 16, further comprising:
    one or more guide vanes within the aerodynamic spinner fairing and configured to direct air received via the airflow intake doors to provide convection cooling.

* * * * *

UNITED STATES PATENT AND TRADEMARK OFFICE
CERTIFICATE OF CORRECTION

PATENT NO. : 10,829,199 B2
APPLICATION NO. : 16/105215
DATED : November 10, 2020
INVENTOR(S) : Foskey et al.

Page 1 of 1

It is certified that error appears in the above-identified patent and that said Letters Patent is hereby corrected as shown below:

In the Claims

In Column 8, Line 42, Claim 16, delete "door." and insert -- door, -- therefor.

Signed and Sealed this
Fifteenth Day of December, 2020

Andrei Iancu
*Director of the United States Patent and Trademark Office*